US012208697B2

(12) United States Patent
Castellano Aldave et al.

(10) Patent No.: US 12,208,697 B2
(45) Date of Patent: Jan. 28, 2025

(54) LANDING PLATFORM WITH ELECTROCONDUCTIVE PLATES FOR UNMANNED AERIAL VEHICLES

(71) Applicant: FUVEX CIVIL, SL, Sarriguren (ES)

(72) Inventors: Jesus Carlos Castellano Aldave, Fontellas (ES); Jesus Villadangos Alonso, Sarriguren (ES); Jose Javier Astrain Escola, Barañain (ES)

( * ) Notice: Subject to any disclaimer, the term of this patent is extended or adjusted under 35 U.S.C. 154(b) by 392 days.

(21) Appl. No.: 17/611,598

(22) PCT Filed: May 15, 2020

(86) PCT No.: PCT/EP2020/063680
§ 371 (c)(1),
(2) Date: Nov. 16, 2021

(87) PCT Pub. No.: WO2020/234177
PCT Pub. Date: Nov. 26, 2020

(65) Prior Publication Data
US 2022/0315248 A1  Oct. 6, 2022

(30) Foreign Application Priority Data
May 17, 2019 (EP) .................................. 19382391

(51) Int. Cl.
*B60L 53/16* (2019.01)
*B64U 50/37* (2023.01)
(Continued)

(52) U.S. Cl.
CPC .............. *B60L 53/16* (2019.02); *B64U 50/37* (2023.01); *B64U 70/90* (2023.01); *B64U 70/92* (2023.01); *B64U 80/25* (2023.01); *B60L 2200/10* (2013.01)

(58) Field of Classification Search
CPC ........ B64U 70/90; B64U 70/92; B64U 80/25; B64F 1/007
See application file for complete search history.

(56) References Cited

U.S. PATENT DOCUMENTS

| 9,561,871 | B2 | 2/2017 | Sugumaran | |
| 2005/0139383 | A1* | 6/2005 | Kent | H05K 3/243 |
| | | | | 439/55 |

(Continued)

FOREIGN PATENT DOCUMENTS

| CN | 109050885 A | * 12/2018 |
| CN | 208699068 U | 4/2019 |

(Continued)

*Primary Examiner* — Joshua J Michener
*Assistant Examiner* — Arfan Y. Sinaki
(74) *Attorney, Agent, or Firm* — Eugenio J. Torres-Oyola; Victor M. Rodriguez-Reyes; Rafael Rodriguez-Muriel

(57) ABSTRACT

The platform comprises supporting legs (12) fastened to the platform (10), and a control unit (13) and provides an electrical charging system including a plurality of coplanar adjacent electroconductive plates (14), with adjacent edges electrically insulated, arranged on an electrically insulated support. Each electroconductive plate (14) is connected by an electroconductive cable (15) to the control unit (13) and to a power source (16), wherein the electroconductive plate (14), electroconductive cable (15) and control unit (13) form an electrical circuit and the control unit (13) is configured to detect a change of an electric potential and/or current of the electrical circuit due to a UAV, landing on said platform and providing at least two points of contact with two different electroconductive plates (14). The platform supply energy, from power source to said two different electroconductive plates (14) using corresponding electroconductive cables (15) in order to charge powering means of said UAV.

16 Claims, 10 Drawing Sheets

(51) Int. Cl.
*B64U 70/90* (2023.01)
*B64U 70/92* (2023.01)
*B64U 80/25* (2023.01)

(56) References Cited

U.S. PATENT DOCUMENTS

| | | | |
|---|---|---|---|
| 2011/0148041 A1* | 6/2011 | Randall | A63H 18/12 |
| | | | 273/237 |
| 2015/0097530 A1* | 4/2015 | Scarlatti | H02J 7/00 |
| | | | 320/109 |
| 2016/0336772 A1* | 11/2016 | Dallachiesa | H02J 7/0042 |
| 2017/0126031 A1 | 5/2017 | Mo | |
| 2017/0217323 A1 | 8/2017 | Antonini et al. | |
| 2018/0237161 A1* | 8/2018 | Minnick | B64C 39/024 |

FOREIGN PATENT DOCUMENTS

| | | | |
|---|---|---|---|
| CN | 110745252 A | | 2/2020 |
| EP | 3045393 B1 | | 7/2016 |
| KR | 20100050652 A | * | 5/2010 |
| KR | 20170040961 A | | 4/2017 |
| WO | 2016/113766 A1 | | 7/2016 |

\* cited by examiner

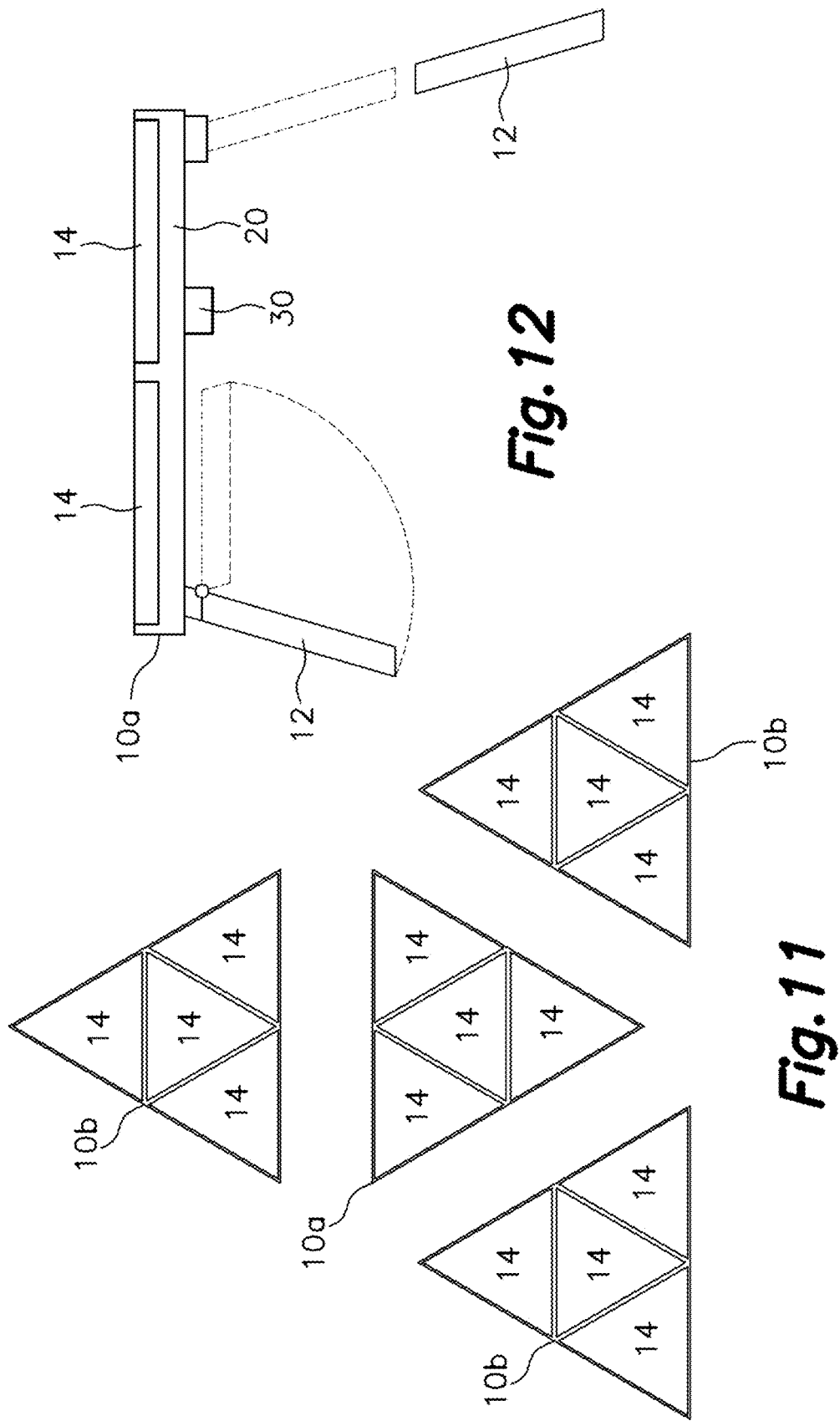

LANDING PLATFORM WITH ELECTROCONDUCTIVE PLATES FOR UNMANNED AERIAL VEHICLES

TECHNICAL FIELD

The present invention discloses a landing platform with electroconductive plates for unmanned aerial vehicles, UAV, preferably vertical take-off and landing, VTOL, unmanned aerial vehicles.

The following terms or acronyms may be used throughout this document and should be understood as having the same connotations: "unmanned aerial vehicle", "UAV", "drone", "aerial vehicle", "aircraft" or "vehicle".

STATE OF THE ART

The use of unmanned aerial vehicles has increased exponentially in recent times for a wide variety of applications, such as security and surveillance and as a new way of delivering goods and/or correspondence.

However, seeing as weight is a key-factor in the design and optimal flight conditions for any kind of aerial vehicle, the powering means included in unmanned aerial vehicles are usually small in size, providing limited flight autonomy, in order to avoid the UAV becoming too cumbersome, and consequently they must be charged frequently if they are used continuously.

As such, the need has arisen for providing landing platforms that can be readily assembled in different locations and include a charging system so that the powering means, usually one or more batteries, of an unmanned aerial vehicle can be recharged.

EP 3045393 B1 discloses a portable device having at least one landing platform with multiple landing zones suitable for charging and housing VTOL unmanned aerial vehicles, said apparatus further including a sensory system made up of at least an array of LED/IR lamps to communicate and assist in automatically landing the unmanned aircraft on the landing platform. The sensory system may further include a phase array antenna, Lidar, a GPS or DGPS receiver, sonar or a beacon signal, amongst others. Each one of the landing zones includes a fixer to perform housing, charging and state data monitoring of the aircraft, once the aircraft has been connected to said fixer. A power supply is disposed in an outer peripheral portion of the landing zone.

U.S. Pat. No. 9,561,871 B2 discloses an aerial vehicle docking system which includes a landing pad, having a concave landing surface and a central depression, and an aerial vehicle including landing gear (wheels or rollers) and a retractable protrusion which is shaped to mate with the central depression of the landing pad. The aerial vehicle docking system comprises a first induction coil included in the aerial vehicle and a second induction coil arranged in the landing pad, both coils being inductively coupled together and configured to transmit power wirelessly from the landing pad to the aerial vehicle when the protrusion of the aerial vehicle has mated with the depression of the landing pad, generating an electric current which is used to charge batteries of an unmanned aerial vehicle.

Patent application US 2017/217323 A1 describes a landing and take-off platform for unmanned aerial vehicles, specifically VTOL aerial vehicle, that includes a plurality of funnel-shaped centering housings that are configured to cooperate with an equivalent number of projections extending from a VTOL unmanned aerial vehicle, so that it lands in a predetermined position. The platform includes a mechanism, electrical contacts, for recharging a battery of the aerial vehicle and/or means for establishing a serial data transfer, when the vehicle is in said predetermined landing position.

However, all the cited prior art documents require the UAV or drone to land in a specific position or else include either conveying means or a coupling configuration in order to reposition the UAV once it has landed so it can be charged, and therefore the UAV must be in said particular position or coupling configuration in order to be charged.

Documents US2017126031A1, US2015097530A1, US2018237161A1, WO2016113766A1, KR20100050652A and CN20869968U describe a landing platform including multiple coplanar electroconductive plates and a control unit monitoring said electroconductive plates to detect a change in the electric potential of a pair of said electroconductive plates indicative of a UAV landed thereon.

The aim of the present invention is to provide a landing platform for unmanned aerial vehicles, which is both easy to transport and mount as it is made of detachable components, and providing a charging system which enables the UAV to land in any portion of the platform in order for it to be charged, and therefore eliminates the need for complex navigation and landing systems or the use of coupling or repositioning means.

Furthermore, the present invention includes supporting members which are capable of adapting to different terrains or locations in order to provide a substantially horizontal surface for the unmanned aerial vehicle to land and take-off adequately.

BRIEF DESCRIPTION OF THE INVENTION

The present invention discloses a landing platform with electroconductive plates for unmanned aerial vehicles (UAV), specifically vertical take-off and landing (VTOL) aircraft.

The proposed platform comprises, in a manner already known from the available state of the art:
  a plurality of supporting legs fastened to an underside of the platform, in order to grant stability to the landing platform and provide a substantially horizontally flat surface for an unmanned aerial vehicle to land on, regardless of the terrain on which it is installed.
  an electrical charging system which comprises a plurality of adjacent and coplanar electroconductive plates with their adjacent edges electrically insulated, e.g. by dielectric separators arranged on an electrically insulated support (for example embedded in it) providing a landing surface. Said electroconductive plates can be arranged for example forming a matrix.

Each electroconductive plate is connected to a power source through an electroconductive cable and is monitored by a control unit, for example by a direct connection on each electroconductive plate with the control unit through an additional conductive cable or by a sensor associated with the electroconductive cables able to detect changes in the electric potential and/or current. Each electroconductive plate can be associated with any other electroconductive plate forming a pair of electroconductive plates defining an electric circuit.

The control unit of the landing platform, cited previously, is configured to:
  detect a change of an electric potential and/or current of said electric circuit due to an unmanned vehicle having land on the platform and establishing at least two points of contact by making an electrical contact of the vehicle with at least two different electroconductive plates, and supply energy from said external power source to said at least two electroconductive plates (by means of a corresponding electroconductive cables), on which the UAV has landed, in order to charge powering means included in said UAV, such as one or more rechargeable batteries.

The control unit is further connected to the power source intended to feed a battery of the UAV through those electroconductive cables to control the delivery of energy of the power source only through the electroconductive plates correctly connected with the UAV and only when necessary.

Therefore, each of the electroconductive plates provide an electric contact configured to cooperate with a corresponding electrical contact in at least one of downward projection of the UAV support base connected to an electrical battery of said UAV, when this vehicle lands on the platform. Thus, the landing area of the platform comprises a plurality of coplanar electro-insulated adjacent electrical contacts.

The UAV will include multiple downward electroconductive projections separated to each other defining a polygonal base support of the UAV, said polygonal base support preferably being equal to or bigger than one electroconductive plate or having a shape and size configured to be able to contain one entire electroconductive plate therein to prevent the landing of the UAV with all the downward electroconductive projections contained in the same electroconductive plate.

The present invention further comprises the following features, which are not known from the available state of the art:
- a central module, made up of at least one unitary module comprising one of said electroconductive plates, the central module having n-edges and including central structural sockets and central electric sockets on at least some of said n-edges, said central electric sockets being connected to the power source through said electroconductive cable,
- multiple secondary modules, each made up of at least one unitary module comprising one of said electroconductive plates, each secondary module having one edge with a secondary structural socket and with a secondary electric socket electrically connected to all the unitary modules contained in the secondary module, said secondary electric socket being detachably connected to one of said central electric sockets, and the secondary structural socket being detachably connected to one of said central structural sockets supporting the secondary modules in cantilever.

According to this, the platform includes a central module including one or more unitary modules, each unitary module including one of the electroconductive plates.

The platform also includes several secondary modules, each including one or more unitary modules, each unitary module including one of the electroconductive plates.

The central module and the secondary modules define said landing surface provided with all the coplanar electroconductive plates.

The perimeter of the central module includes a number of edges provided with a central electric socket connected to the power source and with a central structural socket.

Each secondary module includes at least one edge provided with a secondary structural socket complementary to the central structural socket and with a secondary electric socket complementary to the central electric socket, being all the electroconductive plates contained on each secondary module connected to the secondary electric socket of said module.

Each secondary structural socket is detachably connected to one central structural socket, rigidly attaching the secondary module to the central module transferring structural loads from the secondary module to the central module. As a result, each secondary module is supported in cantilever from the central module by said detachably coupled central and secondary structural sockets.

Each secondary electric socket is detachably connected to one central electric socket providing electric connection to the power source.

It will be understood that a detachably connection is a connection which can be repeatedly connected and disconnected in a non-destructive manner by hand or using only simple manual tools such a screwdriver or a spanner.

One single electrical socket or structural socket can comprise multiple connection pins or connection ports distributed along the same edge.

The central module will include a base structure underneath and each secondary module will also include a base structure underneath. The central and secondary structural sockets, once connected, will provide a rigid connection between said base structures.

An example of said central and secondary structural sockets can include for example complementary pins and holes, or two flat surfaces in contact to each other, one on each edge, connected through bolts or other releasable means.

In addition, it is possible once a vehicle has landed on the platform at any time that the control unit carry out checks on the state of charge and electrical conditions of the vehicle.

While it has been indicated that each plate has an electroconductive cable to feed the UAV, it is possible to include more than one cable to perform separately functions of monitoring and charging.

When the UAV lands on the platform and establishes two or more points of contact with at least two electroconductive plates, according to the number downward electroconductive protrusions the UAV has on its support base, it is possible for one of these downward electroconductive protrusions to land in a point contacting adjacent sides of two or more electroconductive plates. If this occurs, the control unit considers all electroconductive plates which are in contact with the structural support members of the UAV, as a single one in order to supply energy via one of the two electroconductive cables acting here as power cable provided.

In order to avoid short-circuits between downward electroconductive protrusions of the UAV occurring in the event of two or more of these downward electroconductive protrusions landing on the same electroconductive plate, one possible solution would be to design each one of the electroconductive plates, so that their maximum dimension in any direction is shorter than the distance between downward electroconductive protrusions of a UAV.

The UAV, which is associated with and configured to land or take-off from the landing platform of the present invention, has an on-board electric circuit charging system which includes a protection device configured to protect and avoid discharging said powering means (e.g. one or more batteries) of the UAV in the event of a short-circuit, wherein said protection device is a combination of resistors and diodes to avoid current flow when a short-circuit occurs, and simultaneously enabling voltage readings under normal operating conditions, that is to say when no short-circuit occurs. Said on-board electric circuit charging system of the UAV is connected with the charging system of the landing platform, when operational.

Optionally, each of said n-edges of the central module has a secondary module attached thereto, the central module being completely surrounded by said secondary modules.

Preferably the control unit is attached underneath the central module and/or the supporting legs are foldable or detachably connected to said central module, so that the central module can be easily stored and transported, being the control unit integrated thereto.

In order to detect the changes in the electric potential and/or current of the electrical circuit the following features are proposed:
- each electroconductive plate of the central module is connected to the control unit through a signal cable;
- the edges of the central module provided with central structural sockets and central electric sockets further comprise central signal sockets connected to the control unit through a signal cable;
- the edges of the secondary modules provided with secondary structural sockets and secondary electric sockets further comprise secondary signal sockets detachably connected to the central signal sockets, each electroconductive plate of the secondary modules being connected to one secondary signal socket through a signal cable.

Those central and secondary signal sockets provide a detachably signal connection between each electroconductive plate contained in the secondary modules with the control unit.

The signal cables can be used by the control unit to detect any change in the electric potential and/or current between any pair of electroconductive plates of the platform, indicative of a UAV landed on it ready for charging.

The central and secondary signal sockets can be integrated within the central and secondary electric sockets.

Alternatively, the detection of changes in the electric potential and/or current of the electrical circuit is achieved by configuring the control unit to monitor the potential and/or current status of pairs of conductive cables connecting the power source with the electroconductive plates.

For example, the control unit can be connected to one or multiple detectors of changes in the magnetic fields induced on each conductive cable, said detectors facing or surrounding said conductive cables. Alternatively, the control unit can be connected to one or multiple detectors of changes in the potential and/or current of each conductive cable, said detectors being in electric contact with each conductive cable. Many other potential and/or current detection configurations are also possible.

The unitary modules may be designed in any shape, as long as it allows the unitary modules to be laterally connected entirely covering a surface without producing interspaces, permitting the expansion of the platform as much as desired by adding more unitary modules, whilst simultaneously remaining flat.

In order to achieve this, the unitary modules are preferably regular polygons, that is to say polygons which are equiangular and equilateral. Even more preferably, said regular polygons are selected from a group comprising: triangles, squares or hexagons, amongst others.

According to a preferred embodiment, said unitary modules are equilateral triangles, the central module includes one unitary module defining or an array of unitary modules defining a triangular central module with three edges or a hexagonal-shaped central module with six edges, and each secondary module includes one unitary module or an array of unitary modules defining a triangular or trapezial-shaped secondary module, the combination of the central module and the secondary modules defining a triangular or hexagonal-shaped platform.

For example, the central module can include an array of six unitary modules defining a hexagonal-shaped central module with six edges, and each secondary module can include an array of three unitary modules defining a trapezial-shaped secondary module. When one of said secondary modules is connected on each of the six edges of the central module a hexagonal platform is created.

Alternatively, said unitary modules can be squared. In this case the central module will include one unitary module or an array of unitary modules defining a square or rectangular central module with four edges, and each secondary module will include an array of unitary modules defining a square or rectangular secondary module, the combination of the central module and the secondary modules defining a square, rectangular or cross-shaped platform.

For example, the central module can be a squared central module defined by four unitary modules, and each secondary module can include an array of three unitary modules in line which, when connected to all the edges of the central module produce a squared platform. Alternatively, the secondary modules can be a rectangular secondary module including six unitary modules arranged in two rows, producing a bigger squared platform when attached to the central module.

It should be noted that the design or geometry of the unitary modules used to obtain the central module and the unitary modules used for the secondary modules may or may not be the same. Furthermore, the shapes or geometries obtained as a result of the combination of two or more unitary modules, which are regular polygons, does not have to meet with these requirements, and therefore the shape or geometry of either the central module or the secondary modules or both, do not necessarily have to form a regular polygon and therefore such a combination may enable the obtention of other shapes or geometries, such as convex quadrilaterals (e.g. an isosceles trapezium, rhombus, rectangle, amongst others).

Preferably, each one the n-secondary modules which are coupled to one of the n-sides of the central module have a signalling beacon on one of its external sides, said signalling beacon being configured to emit light signals, in a visible spectrum and/or an infrared spectrum, to said transceiver of a UAV.

Preferably, said supporting legs are fastened to the central module of the platform and comprises adjustable supporting legs with an adjustable length, including an extension-retraction mechanism actuated by an associated motor. Said extension-retraction mechanism can be for example a telescopic mechanism.

The control unit can be connected with an inclination sensor attached to the platform and can be configured to control the associated motors of the adjustable supporting legs to automatically level the platform horizontally.

It is also contemplated that the unitary modules integrated in the central module or in the same secondary module are detachably connected to each other through structural sockets, electric sockets or through structural sockets, electric sockets and signal sockets, allowing for a complete disassembly of the platform and the easy and fast substitution of any particular unitary module.

The following examples are used to illustrate the concepts discussed previously, and should be understood in a non-limiting manner:

Example 1

For this particular example, the unitary modules used are in the shape of squares, and both the central module and the secondary modules used are regular polygons.

The central module is a square made up of one unitary module, and therefore the number of sides "n" is 4. Therefore, the platform has at least four secondary modules, seeing as "n=4".

For this particular example, the platform actually uses four secondary modules in order to provide a flat continuous quadrangular landing surface, wherein each one of the secondary modules is made up of two unitary modules, with one unitary module coupled to one of the sides of the central module, and the other unitary module being adjacent to a vertex of the central module, laterally coupled to the other unitary module of the same secondary module.

Example 2

For this particular example, the unitary modules used are in the shape of equilateral triangles, and the central module is a regular polygon whilst the secondary modules are not.

In this case the central module is a hexagon made up of six unitary modules, and therefore the number of sides "n" is 6. Therefore, the platform has at least six secondary modules, seeing as "n=6".

For this particular example, the secondary modules are in the shape of an isosceles trapezium, each one consisting of three unitary modules coupled together, wherein the smaller side of each secondary module is coupled to a respective side of the central module.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not limitative, in which:

FIG. 11 is a top plant view of an exploded platform including one triangular central module, and three triangular secondary modules disposed therearound, extending the landing platform in a triangular shape arrangement;

FIG. 12 is a cross section of one central module including an electrically insulated support with two coplanar adjacent electroconductive plates attached supported thereon, the central module including one inclination sensor and two supporting legs, one foldable and one detachable shown as two alternative embodiments.

DETAILED DESCRIPTION OF AN EMBODIMENT

Figure 1:
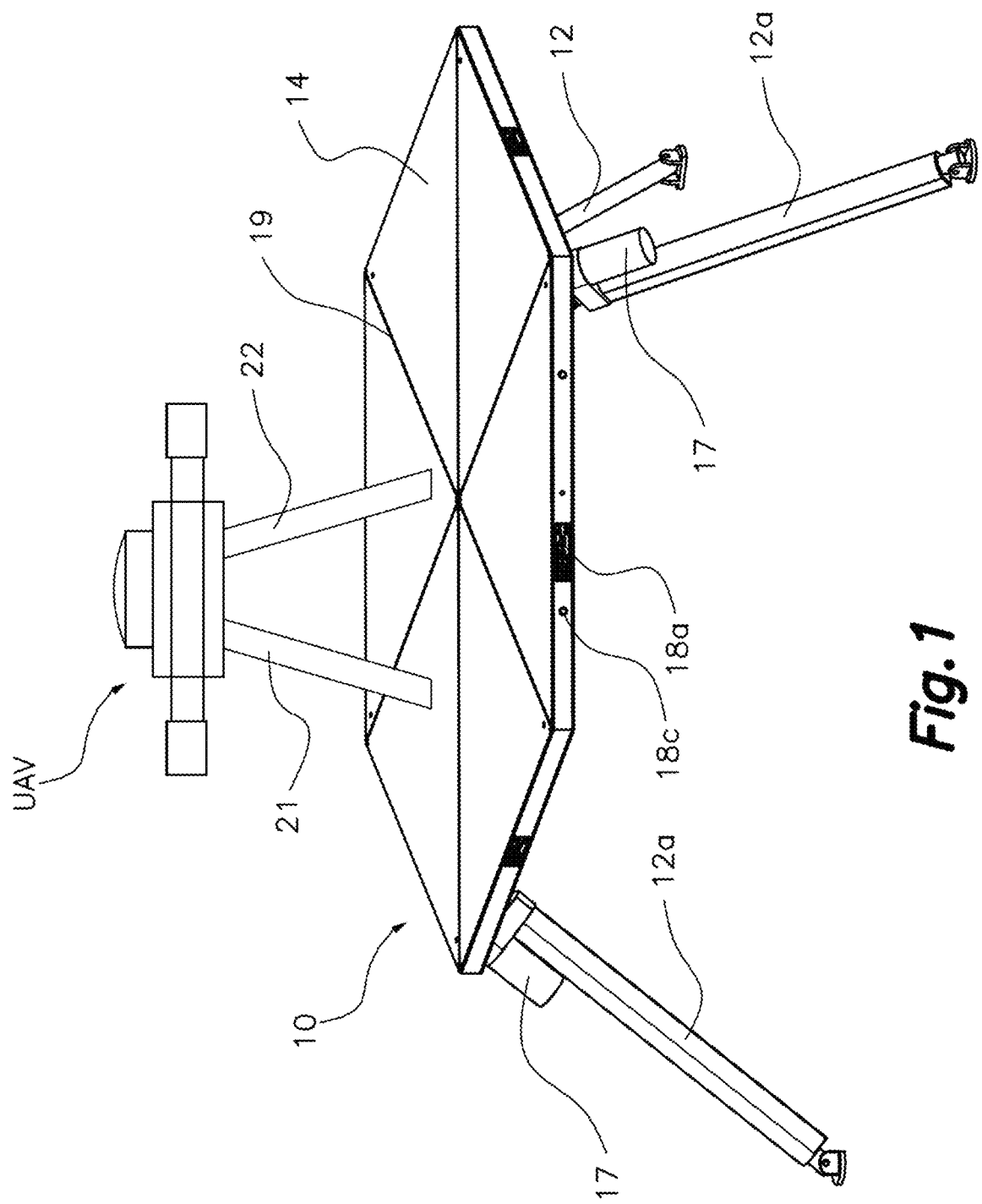
FIG. 1 is a perspective view illustrating an embodiment of a landing platform according to the present invention, that can constitute a central module of a larger platform. In this FIG. 1 it further has been represented schematically the electrical contact of two legs of the vehicle with two of the plates of the platform.
Figure 2:
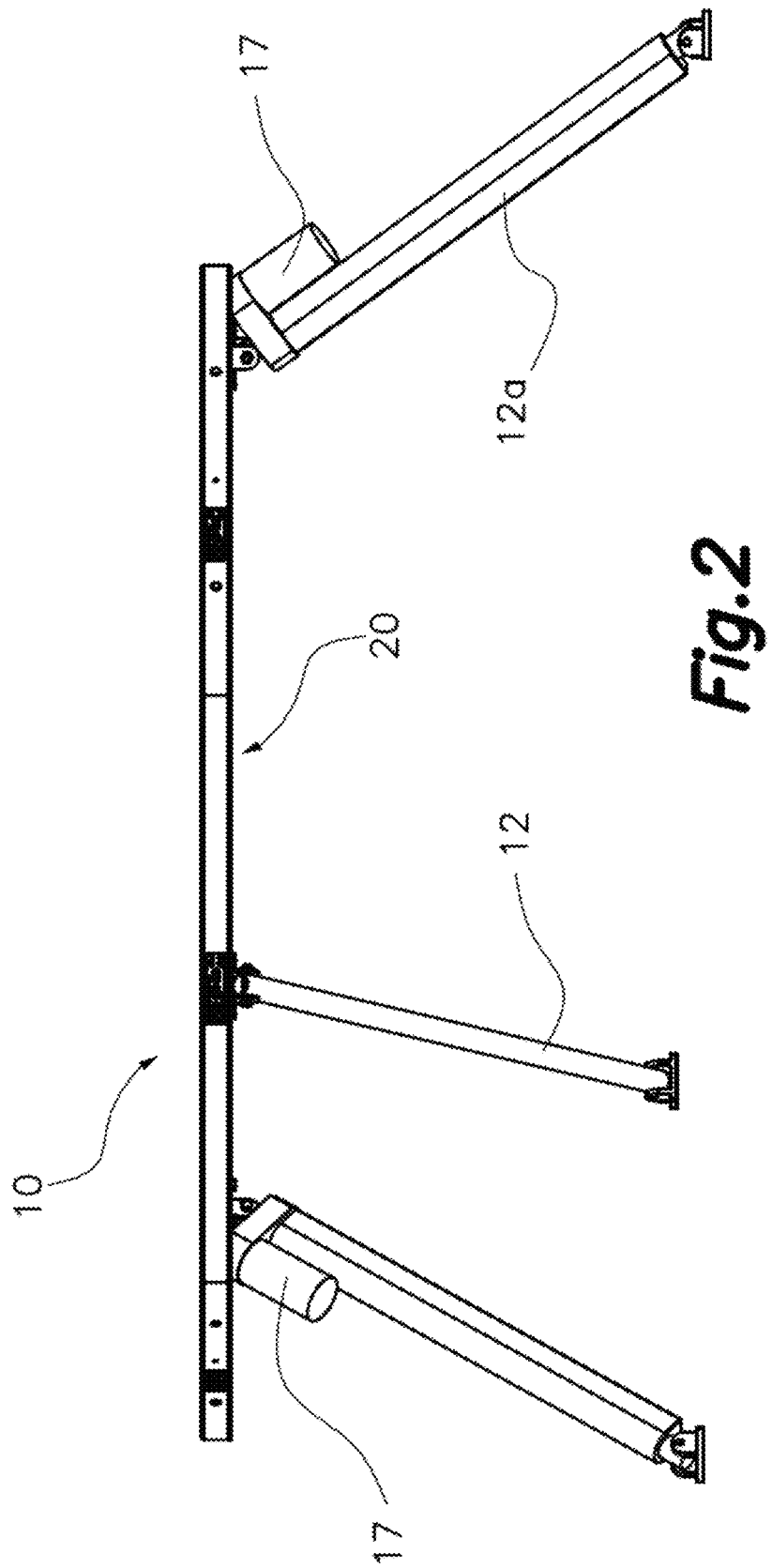
FIG. 2 is a side view of the embodiment of FIG. 1.

As it can be seen in FIG. 1 the landing platform 10 of this invention includes supporting legs 12 fastened to the platform and having a fixed length and two additional adjustable supporting legs 12*a* adjustable in length by an extension-retraction mechanism, for example including a telescopic feature, actuated by associated motors 17. Such motors can be automatically controlled by a control unit 13 connected to an inclination sensor 30 attached to the platform to level de platform horizontally.

The landing platform provides an electrical charging system for an UAV equipped with a base with several downward conductive projections landed thereon.

Said electrical charging system comprises a plurality of coplanar adjacent electroconductive plates 14, with their adjacent or neighbouring edges electrically insulated, the plates 14 being arranged on an electrically insulated support 20 (for example embedded in it), and with each electroconductive plate 14 being connected with one electroconductive cable 15 to a power source 16 to provide electrical connection and being able to provide electrical energy to said electroconductive plates 14.

Each electroconductive plate 14 is monitored and electrically controlled by a control unit 13.

Figure 7:
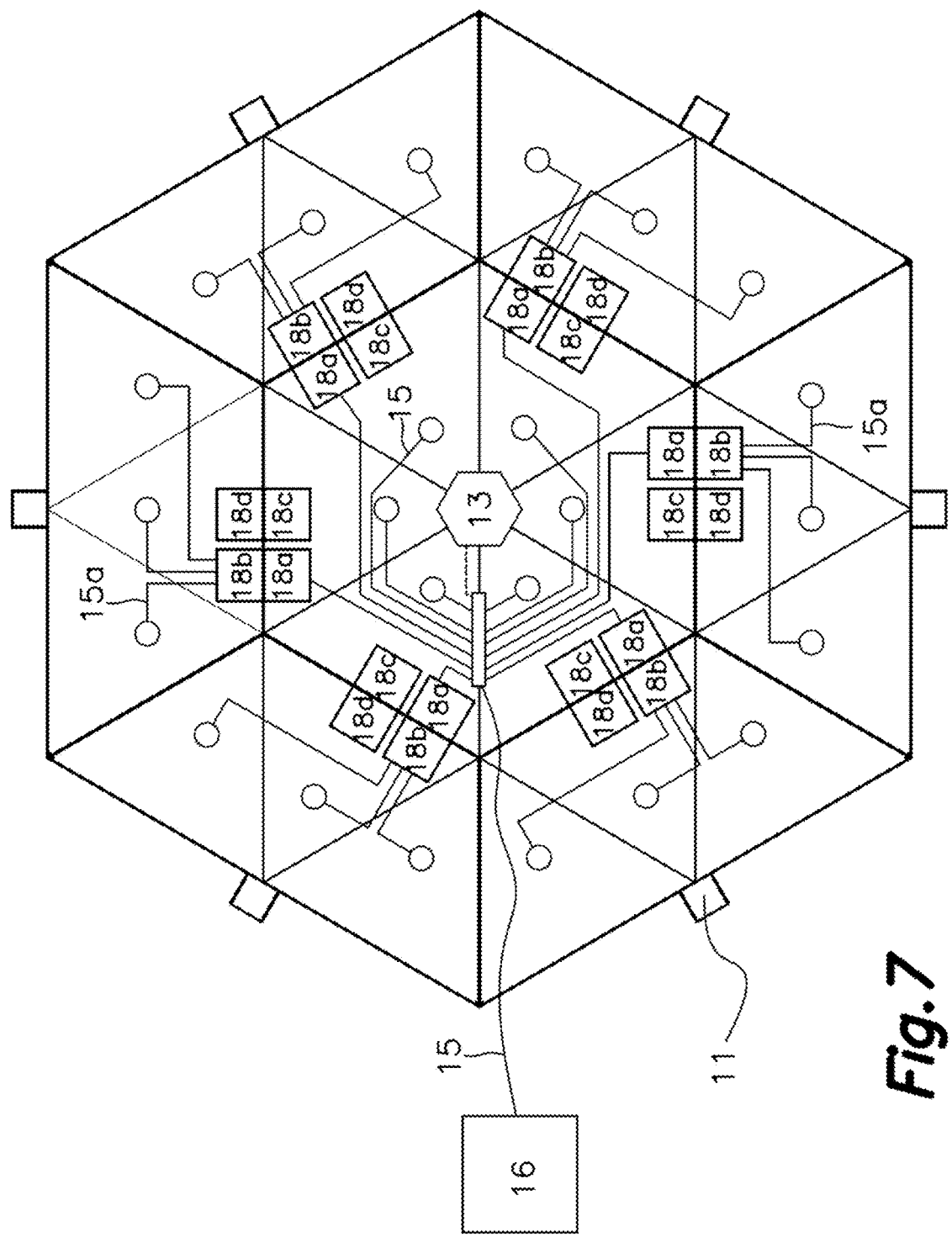
FIG. 7 is a bottom plant view of the landing platform of FIG. 3 according to a first embodiment wherein each electroconductive plate is connected to the power source (connection symbolized by a circle), through a conductive cable, all the conductive cables being monitored by the control unit to detect any change in the potential and/or current in a pair of said conductive cables.

According to an embodiment shown on FIG. 7 said monitoring of the electroconductive plates 14 is produced by one or multiple detectors of changes in the magnetic fields induced on each conductive cable connected to the control unit 13, said detectors facing or surrounding said conductive cables 15. Alternatively, the control unit 13 can be connected to one or multiple detectors of changes in the potential and/or current of each conductive cable 15, said detectors being in electric contact with each conductive cable 15. Many other potential and/or current detection configurations are also possible.

The control unit 13 also control the delivery of electric energy from the power source 16 to each electroconductive plate 14.

Said control unit 13 can be for example a programable logic controller, a microcontroller, a computer or other programable electronic device.

Any electroconductive plate 14 can be associated with any other electroconductive plate 14 forming a pair or electroconductive plates 14.

Power source 16 can be installed near the landing platform 10 or at a distance thereof.

The control unit 13 is configured to for at least:
detect a change of the magnetic field and/or a change of an electric potential and/or current of an electrical circuit due to a UAV, landing on said platform 10 and providing at least two touch points of contact of electroconductive legs 21 and 22 of the UAV with at least two different electroconductive plates 14 (the electrical circuit being composed of two cables 15 connecting the two adjacent plates 14 and through the electroconductive legs 21 and 22 of the UAV), and
supply energy, from said power source 16 to said at least two electroconductive plates 14 using said electroconductive cables 15 (one for each of the plates 14) in order to charge powering means of said UAV.

The control unit 13 is further configured to perform operations to control the state of charge and electrical conditions of the UAV once the UAV has landed on the platform using said electroconductive cables 15 (one for each of the plates 14).

Figure 4:
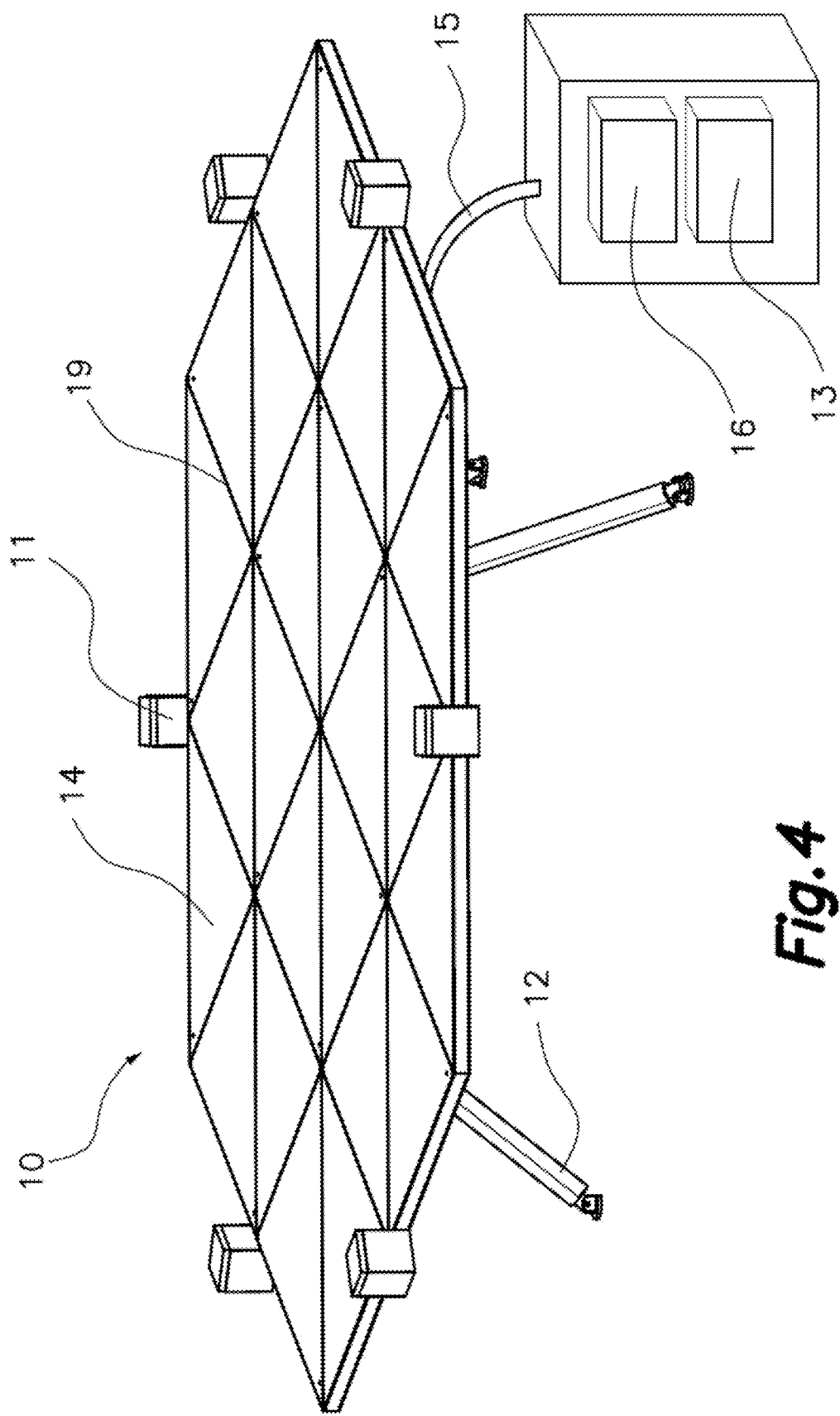
FIG. 4 is a perspective view of a landing platform having a trapezial-shaped secondary modules coupled to the n edges of a central module as the one in FIG. 1. The power source and a control unit are also schematically indicated.
Figure 5:
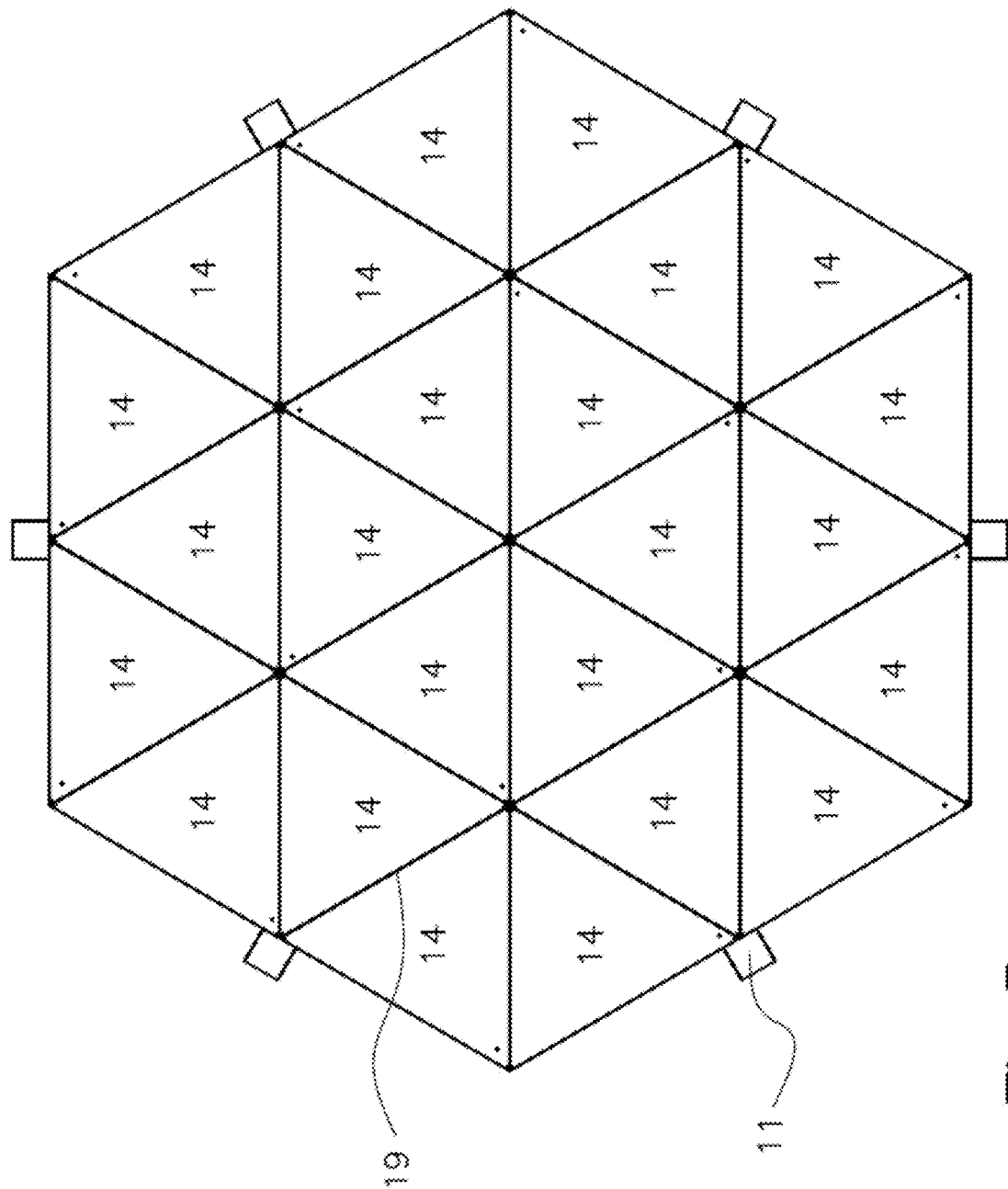
FIGS. 5 and 6 are a top plant view and a side view of the landing platform of FIG. 4.
Figure 6:
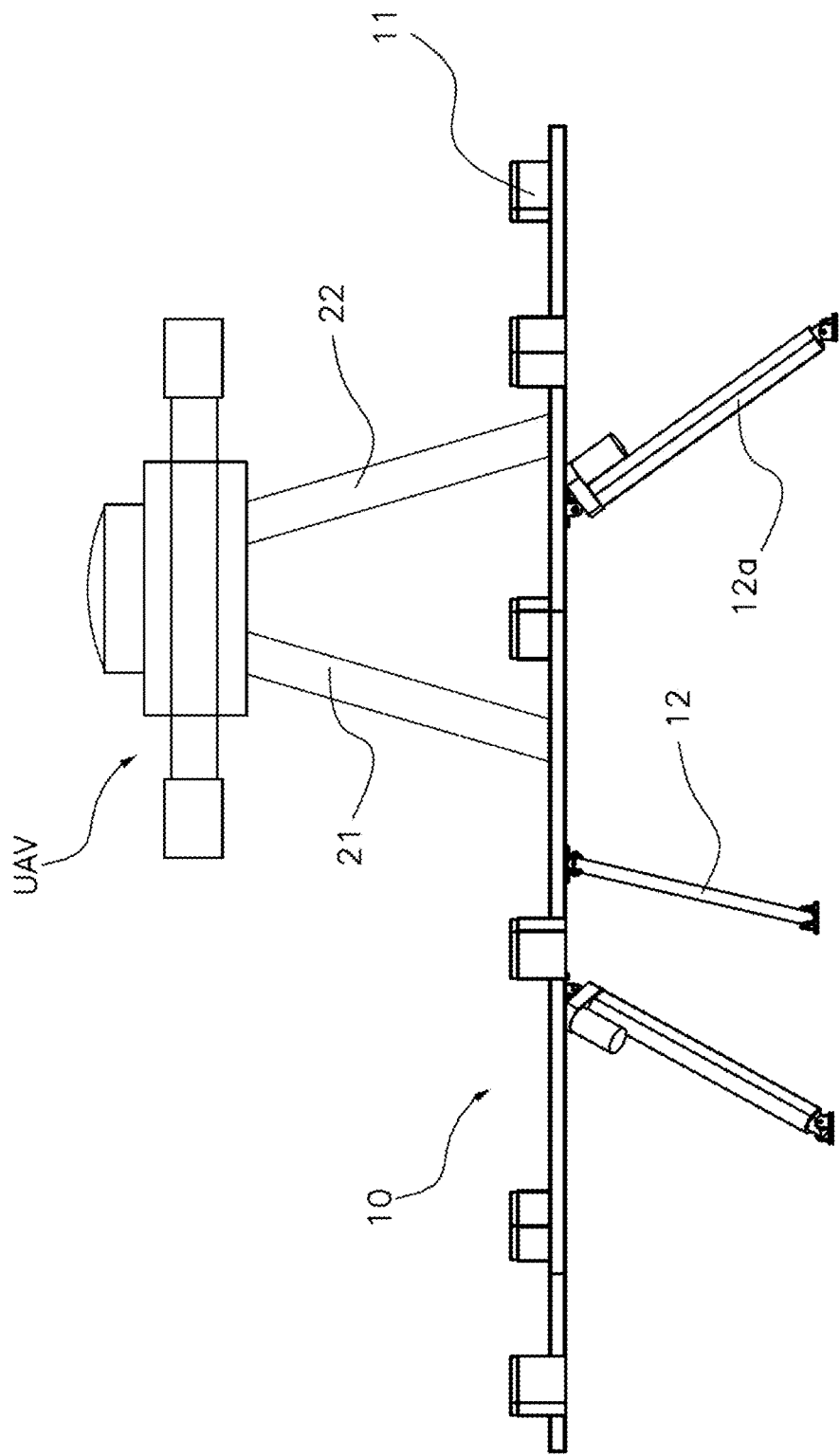

The landing platform as can be seen considering FIGS. 1 and 4 is made up of a plurality of unitary modules coupled together, with each unitary module comprising an electroconductive plate 14, said unitary modules being adjacent and coplanar to one another.

The proposed platform 10 comprises:
a central module 10a, made up in this embodiment of one or more unitary modules, having a total of n-sides, and
at least n-secondary modules 10b, coupled to each one of the n-sides of the central module 10a, wherein each one of the n-secondary modules 10b is made up of one or more unitary modules.

Figure 3:
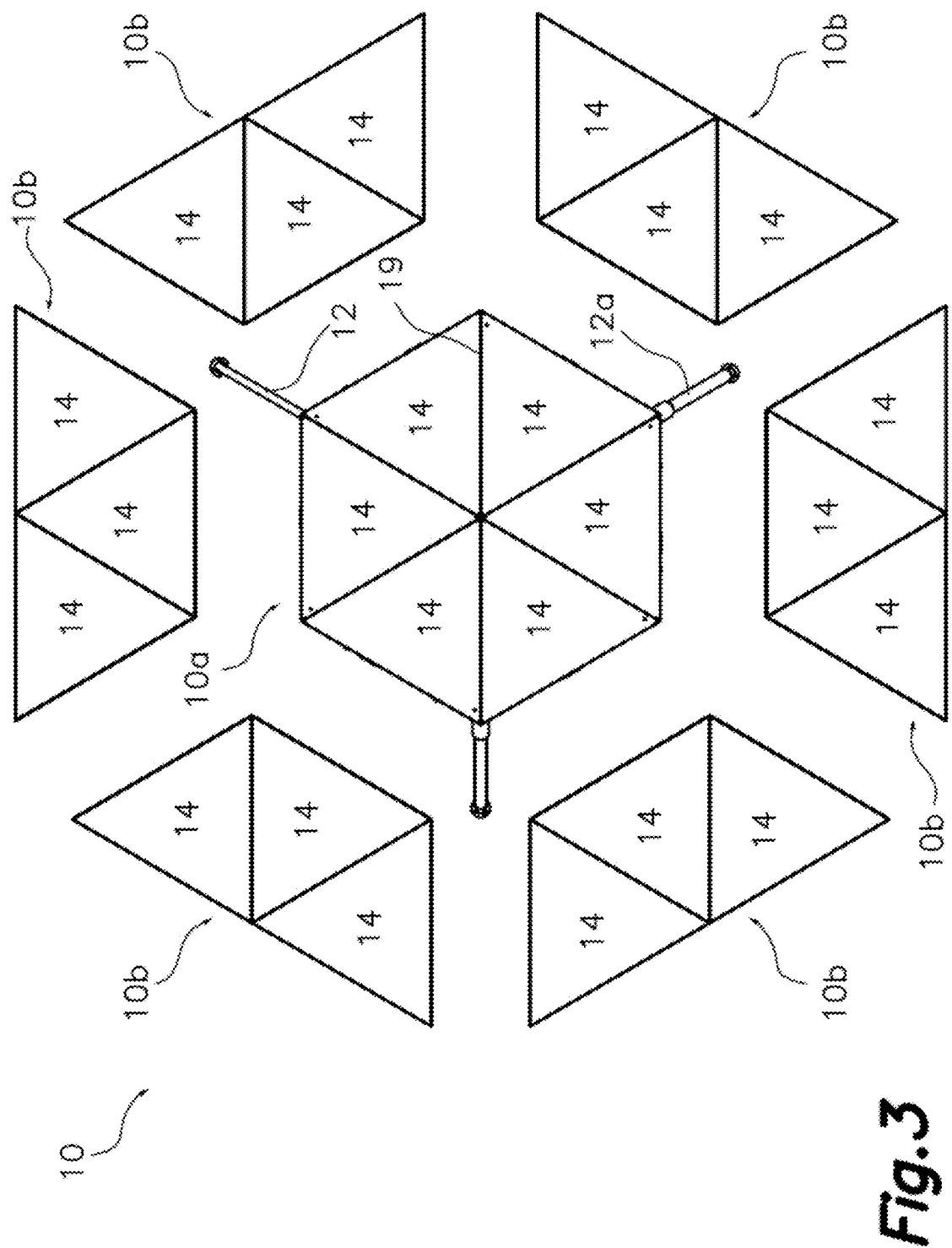
FIG. 3 is a top plant view of an exploded platform including one hexagonal central module as the one in FIGS. 1 and 2, and six trapezial-shaped secondary modules disposed therearound, extending the landing platform.

According to the embodiment of FIG. 3 the landing platform 14 comprises:
a hexagonal central module 10a, made up of 6 unitary modules, and
secondary modules 10b that are trapeziums made up of 3 unitary modules,
wherein the unitary modules are equilateral triangles.

As it can be seen in FIG. 7, each of the n-edges of the central module includes a central electric socket 18a and a central structural socket 18c, to establish an electrical and structural connection with a corresponding secondary electric socket 18b and secondary structural socket 18d of an edge of an adjacent secondary module 10b.

The central module receives on the underside a number of electroconductive cables 15 one per each of the electro conductive plates 14 of the central module 10a (or one cable 15, distributed to the other electro conductive plates 14 of the central modules 10a), and the other remaining secondary electroconductive plates 14 are connected to the central module 10a via electroconductive cables 15a connected to the peripheral central electric sockets 18a of the n-edges of the central module 10a. Thus, each one of the central module electroconductive plates 14 is electrically connected by a corresponding electroconductive cable 15 and the other electroconductive plates 14 of the secondary modules 10b surrounding the central module 10a receive the electrical connection by a corresponding cable 15a via one of the mentioned secondary and central electric sockets 18a and 18b connected each other on the adjacent edges.

The secondary modules 10b are kept in place in regard with the central module 10a and are supported on said central module 10a through the mentioned secondary and central structural sockets 18c and 18d connected each other on the adjacent edges.

Preferably the supporting legs 12 are fastened to the central module 10a and the secondary modules 10b are supported on the central module 10a in cantilever through said connection between the central and secondary structural sockets 18c and 18d.

Said central and secondary structural sockets 18c and 18d can be for example complementary clamping configurations which, once coupled, can transmit structural loads therethrough, said central structural socket 18c being integrated in a base structure of the central module 10a and the secondary structural socket 18d being integrated in a base structure of the secondary modules 10b, and the connection between the central and secondary structural sockets 18c and 18d stablishing a structural continuity between said base structures. Said central and secondary structural sockets 18c and 18d can include complementary pins and holes, lugs and dowels, dovetail connections, releasable clips, and many other.

In this case, a change of the potential and/or current in a pair of electroconductive plates 14 due to the landing of a UAV thereon (electrically bridging them) is detected by a detector monitoring the electroconductive cables 15, 15a, connected to said electroconductive plates 14.

Figure 8:
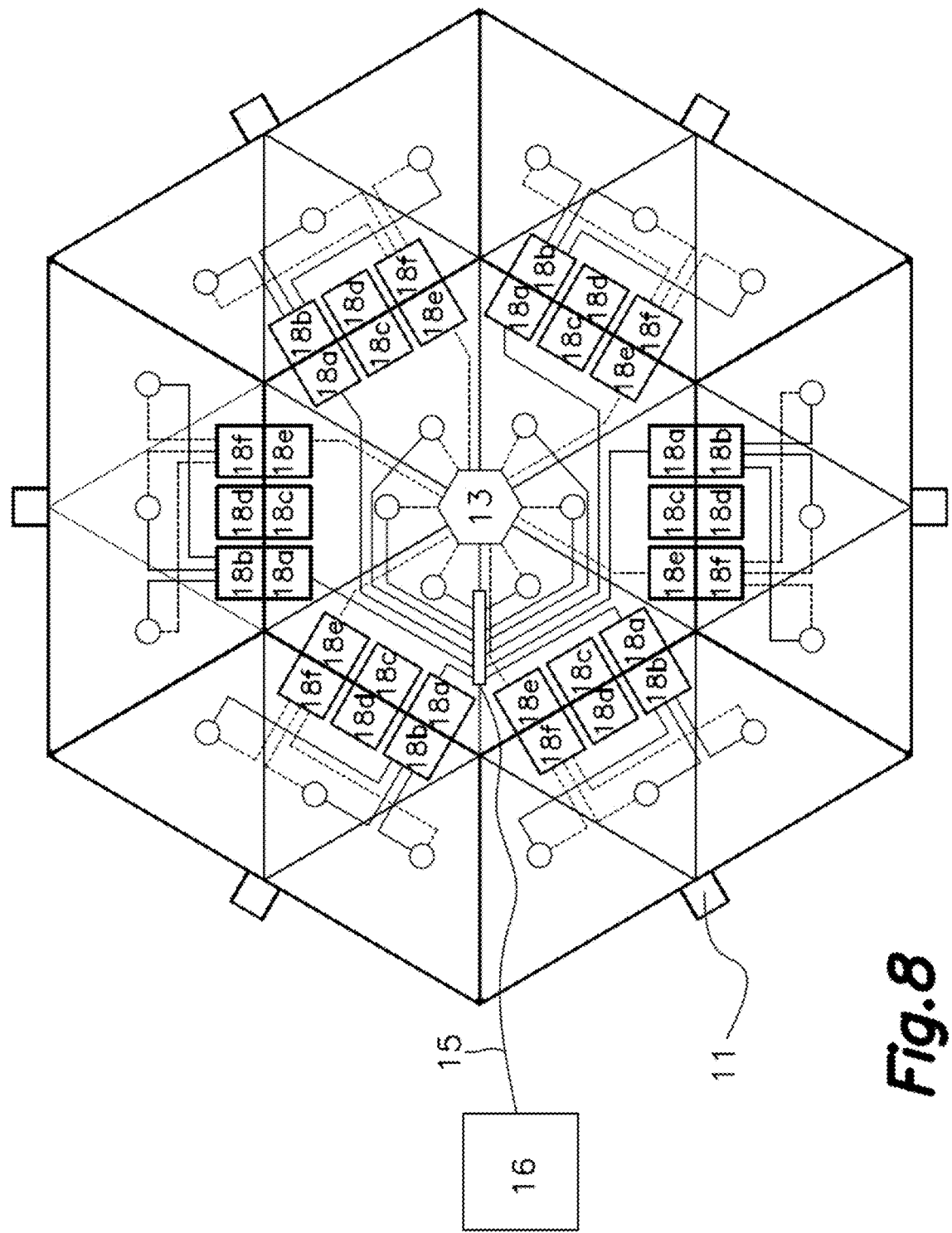
FIG. 8 shows the same view than FIG. 7 but according to an alternative embodiment in which each electroconductive plate is connected to the power source through a conductive cable (connection symbolized by a circle) and also connected to the control unit through an additional conductive cable, shown as a dashed line, used by said control unit to detect any change in the potential and/or current between a pair of electroconductive plates.
Figure 10:
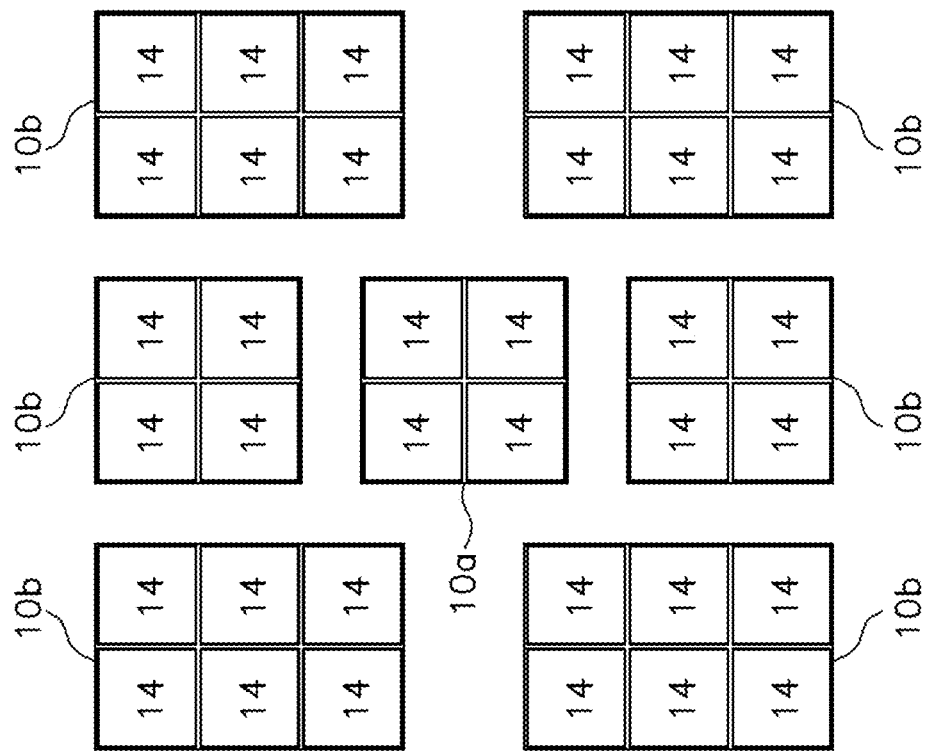
FIG. 10 is a top plant view of an exploded platform including one squared central module, and four rectangular secondary modules and two squared secondary modules disposed therearound, extending the landing platform in a squared shape arrangement.
Figure 9:
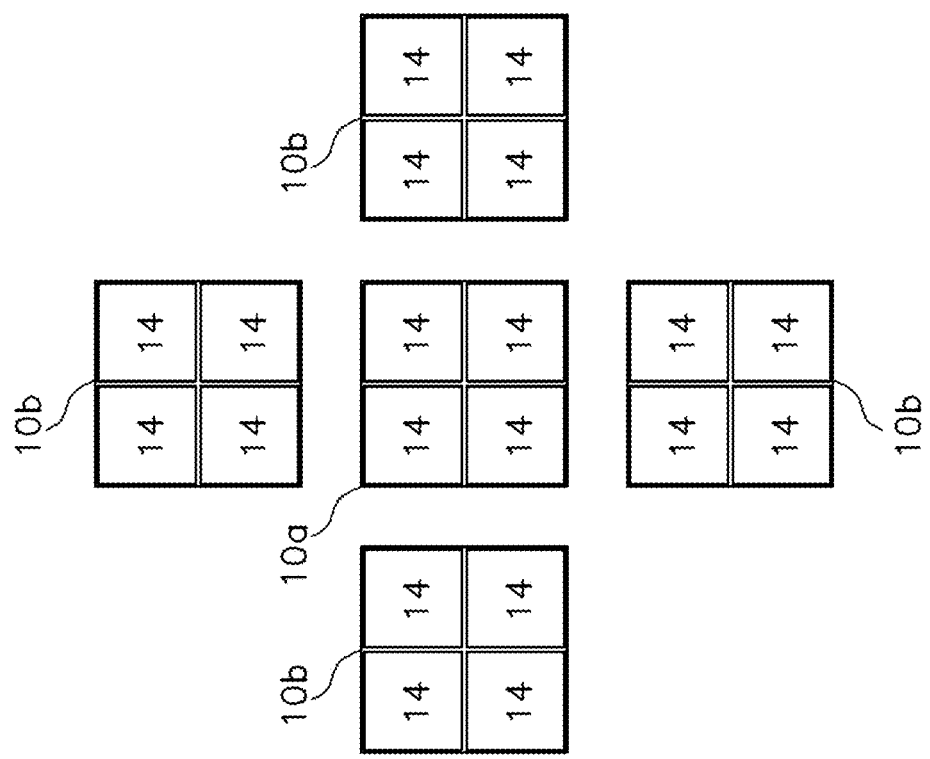
FIG. 9 is a top plant view of an exploded platform including one squared central module, and four squared secondary modules disposed therearound, extending the landing platform in a cross-shape arrangement.

Alternatively, as shown on FIG. 8, the control unit 13 is directly connected with each electroconductive plate 14 of the platform through a cable. The electroconductive plates 14 of the central module 10a are directly connected to the control unit 13, which is preferably integrated on said central module, and the central module further comprise, on each edge, a central signal socket 18e connected with the control unit 13 through a cable. The electroconductive plates 14 of each secondary modules 10b are connected to a secondary signal socket 18f which connects said electroconductive plates 14 with the control module 13 through the connection between the central and secondary signal sockets 18e and 18f, allowing the control unit 13 to detect when a pair of electroconductive plates 14 suffer a change in the potential and/or current for the landing of a UAV thereon.

Once a pair of electroconductive plates 14 forming an electrical circuit suffering a change in the potential and/or current is detected by the control unit 13, said control unit 13 can communicate with said UAV to determine the need of a recharge and can control the delivery of electric energy to said pair of electroconductive plates 14 from the power source 16.

When the control unit 13 communicates with said UAV to recharge the UAV, previously to recharge, the control unit 13 and the UAV exchanges each other electrical internal information so that they can be electrically coupled.

During this exchange of electrical information the information inter-changed is related to electrical connections characteristics, for example if the UAV is able to charge without taking into account the polarity of the powered potential on its legs 21-22, the amount of current, voltage and/or power that the UAV is able to manage, and other communication and/or electrical parameters to ensure a safe electrical interconnection for charging or maintenance operations.

The power source 16 can be a transportable battery, a transportable generator, a connection to the grid or other alternatives.

In FIG. 4 the set of cables 15 have been indicated as single hose containing them by way of example.

FIG. 4 also shows that each of said n-secondary modules have a signalling beacon (11) at an external side configured to emit light signals to a UAV in a visible spectrum and/or an infrared spectrum. This light signal could be from any other part of the spectrum, e.g. UV.

According to a preferred embodiment the insulation of the adjacent edges of the electroconductive plates 14 is obtained by means of a dielectric sheet 19 or profile arranged between the adjacent edges.

It should be noted that when it has been indicated that a cable 15 is provided for each electroconductive plate 14, this cable 15 may contain two separate and different lines, one for potential and/or current detection and the other for electrical power supply.

It will be understood that various parts of one embodiment of the invention can be freely combined with parts described in other embodiments, even being said combination not explicitly described, provided there is no harm in such combination.

The invention claimed is:

1. A landing platform for unmanned aerial vehicles (UAVs), having an electrical charging system, the platform comprises:
    a plurality of supporting legs fastened to an underside of the platform, and
    a plurality of coplanar adjacent electroconductive plates with electrically insulated from edges of adjacent electroconductive plates, the electroconductive plates being arranged on an electrically insulated support, with each electroconductive plate being connected with at least one electroconductive cable to a power source and being monitored by a control unit, wherein pairs of electroconductive plates of the plurality of coplanar adjacent electroconductive plates define an electrical circuit;
    a central module, made up of at least one unitary module comprising at least one of the electroconductive plates, the central module having a first number of edges and including central structural sockets and central electric sockets on at least one of the edges, each of the central electric sockets being connected to the power source through an electroconductive cable,
    multiple secondary modules, each made up of at least one unitary module comprising one of the electroconductive plates, each secondary module having one edge with a secondary structural socket and with a secondary electric socket electrically connected by an electrical cable to all the electroconductive plates comprised in the at least one unitary module contained in the secondary module, the secondary electric socket being detachably connected to one of the central electric sockets, and the secondary structural socket being detachably connected to one of the central structural sockets supporting the secondary modules in cantilever;

the control unit is configured to for at least:
    detect a change of an electric potential and/or a current of the electrical circuit due to an unmanned aerial vehicle (UAV) landing on the platform and the unmanned aerial vehicle (UAV) making electrical contact with at least two different electroconductive plates of the electroconductive plates comprised in the central module and/or in the secondary modules, and
    supply energy, from the power source to the at least two electroconductive plates of the electroconductive plates comprised in the central module and/or in the secondary modules in electrical contact with the unmanned aerial vehicle (UAV) using the at least one corresponding electroconductive cable of each of the at least two electroconductive plates of the electroconductive plates comprised in the central module and/or in the secondary modules in electrical contact with the unmanned aerial vehicle (UAV), to charge a powering device of the unmanned aerial vehicle (UAV).

2. The landing platform according to claim 1, wherein the control unit is further configured to perform operations to control the state of charge and electrical conditions of the UAV once the UAV has landed on the platform.

3. The landing platform according to claim 1, wherein each of the edges of the central module has a secondary module attached thereto.

4. The landing platform according to claim 1, wherein the control unit is attached underneath the central module and/or the supporting legs are foldable or detachable from the central module.

5. The landing platform according to claim 1, wherein
    each electroconductive plate of the central module is connected to the control unit through a signal cable;
    the edges of the central module provided with central structural sockets and central electric sockets further comprise central signal sockets connected to the control unit through a signal cable;
    the edges of the secondary modules provided with secondary structural sockets and secondary electric sockets further comprise secondary signal sockets detachably connected to the central signal sockets, each electroconductive plate of the secondary modules being connected to one secondary signal socket through a signal cable.

6. The landing platform according to claim 1, wherein the control unit is configured to monitor an electrical potential and/or current status of pairs of conductive cables connecting the power source with the electroconductive plates.

7. The landing platform according to claim 1, wherein the unitary modules of the central module and of the multiple secondary modules are regular polygons.

8. The landing platform according to claim 1, wherein the unitary modules of the central module and of the multiple secondary modules are equilateral triangles, the central module is a triangular central module with three edges or is a hexagonal-shaped central module with six edges, and each secondary module is a triangular secondary module or is a trapezial-shaped secondary module, the combination of the central module and the secondary modules defining a triangular or hexagonal-shaped platform.

9. The landing platform according to claim 1, wherein the unitary modules of the central module and of the multiple secondary modules are squared, the central square central module or is a rectangular central module with four edges, and each secondary module is a square secondary module or is a rectangular secondary module, the combination of the central module and the secondary modules defining a square, rectangular or cross-shaped platform.

10. The landing platform according to claim 1, wherein the plurality of supporting legs are fastened to the central module of the platform.

11. The landing platform according to claim 1, wherein the plurality of supporting legs comprises adjustable supporting legs with an adjustable length.

12. The landing platform according to claim 11, wherein the adjustable supporting legs include an extension-retraction mechanism actuated by an associated motor.

13. The landing platform according to claim 12, wherein the control unit is connected with an inclination sensor attached to the platform and is configured to control the associated motors of the adjustable supporting legs to level the platform horizontally.

14. The landing platform according to claim 1, wherein the platform has multiple signalling beacons at external edges thereof, wherein the signalling beacons being configured to emit light signals to the unmanned aerial vehicle (UAV) in at least a visible spectrum and/or an infrared spectrum.

15. The landing platform according to claim 1, wherein the adjacent edges of the electroconductive plates are electrically insulated by a dielectric sheet arranged between the adjacent edges.

16. The landing platform according to claim 1, wherein the central module or the secondary module is made up of a plurality of the unitary modules detachably connected to each other through structural sockets, electric sockets or through structural sockets, electric sockets and signal sockets.

* * * * *